United States Patent Office 3,447,940
Patented June 3, 1969

3,447,940
PAINT COMPOSITION CONTAINING
POLYSACCHARIDES
Frank E. Halleck, Old Saybrook, Conn., assignor to The
Pillsbury Company, Minneapolis, Minn., a corporation
of Delaware
No Drawing. Continuation of application Ser. No. 452,-
330, Apr. 30, 1965, which is a continuation-in-part of
application Ser. No. 449,581, Apr. 20, 1965. This application Dec. 4, 1967, Ser. No. 687,919
The portion of the term of the patent subsequent
to Jan. 31, 1984, has been disclaimed
Int. Cl. C09d 3/10
U.S. Cl. 106—162                                    20 Claims

ABSTRACT OF THE DISCLOSURE

Water-based paints exhibiting improved storage stability and application properties are achieved by incorporating into the paint composition a water-soluble polysaccharide consisting essentially of a polymeric chain of D-glucopyranose units attached to one another by a beta 1,3 linkage to form a polymeric chain with appendant D-glucopyranose groups contiguously attached to the polymeric chain through a beta 1,6 linkage.

This application is a continuation of my application, Ser. No. 452,330, filed on Apr. 30, 1965, now abandoned, which is a continuation-in-part of my application, Ser. No. 449,581, filed on Apr. 20, 1965, now abandoned, which is a continuation-in-part of my application Ser. No. 319,093, filed on Oct. 24, 1963, now U.S. Patent 3,301,-848, which is a continuation-in-part of my application, Ser. No. 235,904, filed on Oct. 30, 1962, now abandoned.

This invention relates to paints. More particularly the present invention relates to paint compositions containing a polysaccharide.

It is an object of the present invention to improve the brushing qualities of water-based paints and to obtain smoother dried paint films.

Another object of the invention is to provide a paint composition having improved freeze-thaw characteristics.

A further object is to provide paint compositions containing a novel thickener which provides superior characteristics to the paint compositions.

An additional object of the invention is to improve the adhesion of paints containing film-formers to various surfaces.

According to the present invention, there is provided a novel paint composition containing a paint pigment and a polysaccharide, said polysaccharide consisting essentially of a polymeric chain of glucopyranose units. The glucopyranose units being contiguously attached to one another by a beta 1,3 linkage to form a polymeric chain, said polymeric chain having side chains of glucopyranose units contiguously attached to the polymeric chain through a beta 1,6 linkage.

By employing the polysaccharide herein disclosed in paint compositions, an increased paint viscosity is achieved without a concomitant sacrifice in application characteristics. The paint compositions herein provided flow evenly and with ease, due to the lubricity of the polysaccharide, when applied by conventional methods. Although the polysaccharides are added primarily as thickeners, it has been found that they also materially contribute to maintaining inert partials such as pigments, latex and other paint ingredients in suspension. Oils such as linseed oil will remain in a finely dispersed form due to the presence of the polysaccharide. Consequently, a more uniform dispersion of the various paint ingredients is achieved, which results in a superior paint film when the paint composition is applied to a surface.

The amount of polysaccharide employed of course differs from one paint composition to another depending upon the formulation. Any amount of the polysaccharide will produce some effect upon the advantageous properties of the paint composition. From viscosity measurements, the required amount of polysaccharide can readily be calculated. In general amounts ranging from about 0.1 to about 2 weight percent (based upon the total water content of the paint composition) are sufficient with an amount less than 1.5 weight percent being preferred.

The polysaccharides and derivatives thereof contemplated by the present invention may be further represented by the structural formula:

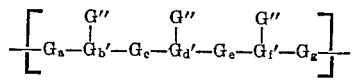

wherein G′ is a glucopyranose unit of the formula:

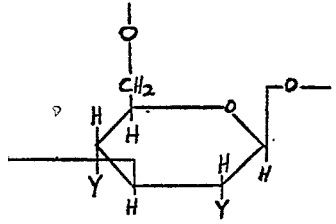

which is contiguously attached to the adjacent glucopyranose units through a beta 1,3 linkage in the polymeric chain and also appended to another glucopyranose unit through a beta 1,6 linkage to form a side chain. G is glucopyranose units of the formula:

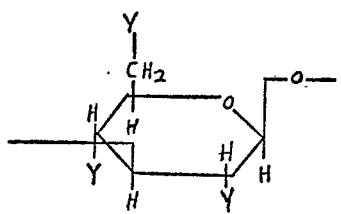

G″ is a glucopyranose unit attached to the G′ glucopyranose unit through a beta 1,6 linkage of the formula:

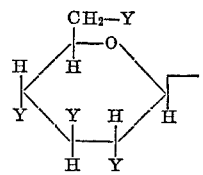

Y is a hydroxyl or derivative thereof. Typically, Y is at least one member selected from the class consisting of OH, OR, OOCR, OCH$_2$COOM, OSO$_3$M, OPO$_3$M, ONO$_2$, OCS$_2$M, OOCNHR such as OOCNH$\phi$, OOCNRR′ where R and R′ are members of the class consisting of lower alkyl or aryl or derivatives thereof. Preferably Y is a hydroxyl group (i.e. the unsubstituted polysaccharide. $\phi$ is a phenyl group and M is a cation (e.g. a monovalent or polyvalent cation). a, b, c, d, e, f, and g are integers from 0 to 1 such that the ratio of the sum of G units to gentiobiose, i.e.

ranges from 3:1 to 4:3. Advantageously, a, b, c, d, e, f, and g are values that the ratio of the sum of G units to G′ units (gentiobiose) ranges from about 5:2 to about 3:2 with a ratio of between 2:1 to 3:2 providing superior properties when the polysaccharides are employed in an aqueous system.

The fermentate polysaccharides are further characterized by the following: (a) yielding only D-glucose when subjected to hydrolysis by 1 N sulfuric acid at approximately 100° C.; (b) yielding from about 20 to about 30 mole percent formic acid and a first residue when subjected to periodate oxidation as ascertained by the conventional analytical technique of carbohydrate chemistry which is more fully described by F. Smith and R. Montgomery, "The Chemistry of Plant Gums and Mucilages," Reinhold (New York, 1959), pp. 144–222; (c) said first residue yielding from about 20 to about 30 mole percent glycerol and an insoluble second residue when subjected to reduction by sodium borohydride followed by hydrolysis with dilute sulfuric acid (e.g. 0.1 N at 20° C. for 6 hours); (d) said second residue yielding only D-glucose when subjected to the enzymatic action of the beta 1,3 D-glucanose which is derived from the organism Basidiomycete No. 806; and (e) yielding a weight ratio of D-glucose to gentiobiose ranging from about 3:1 to about 4:3 and advantageously ranging from about 5:2 to about 3:2 and most preferably between 2:1 and 3:2 when the polysaccharide is subjected to the enzymatic action of the beta 1,3 D-glucanase which is derived from the organism Basidiomycete No. 806, i.e. ratio of G to gentiobiose

In general the polysaccharides prepared by the organisms herein disclosed which have not been subjected to degradation (e.g. by Basidiomycete No. 806) have an average molecular weight in excess of about 19,000. Advantageously provided are those polysaccharides which have an average molecular weight in excess of 50,000 with those having a molecular weight in excess of 100,000 providing exceptional physical properties in an aqueous system. Exemplary average molecular weights of the polysaccharides herein provided include those having an average molecular weight ranging from about 19,000 to about 300,000.

The polymers employed in the instant paint compositions are prepared by the reaction of certain organisms hereinafter disclosed in a medium containing a carbohydrate source material. Organisms which produce members of the polysaccharides herein disclosed include: *Sclerotium glucanicum*, Pillsbury Culture Code No. 13, n.s.p. (NRRL 3006); *Sclerotium delphinii* Jersveld/Welch, American Type Culture Collection No. 15198 (source: Centraalbureau Voor Schimmelcultures Baarn, Netherlands); *Sclerotium delphinii* Welch/White, American Type Culture No. 15200; *Sclerotium rolfsii* Barnett, American Type Culture Collection No. 15203; *Sclerotium rolfsii* Barnett, American Type Culture Collection No. 15206; *Sclerotium rolfsii* Barnett, American Type Culture Collection No. 15201; *Sclerotium rolfsii* Barnett, American Type Culture Collection No. 15205; *Sclerotium rolfsii* Gilman, American Type Culture Collection No. 15195; *Sclerotium delphinii* Gilman, American Type Culture Collection No. 15197; *Sclerotium delphinii* Stevens I, American Type Culture Collection No. 15194; *Sclerotium delphinii* Welch/Mix, American Type Culture Collection No. 15199; *Sclerotium delphinii* Steven, American Type Culture Collection No. 15196; *Sclerotium coffeicolum* Stahel, American Type Culture Collection No. 15208; *Schlerotium rolfsii* QM, American Type Culture Collection No. 15202; *Sclerotium rolfsii* QM, American Type Culture Collection No. 15204; *Corticium rolfsii* Curzi/Balducci, American Type Culture Collection No. 15211; *Corticium rolfsii* (Sacc) Curzi, American Type Culture Collection No. 15210; *Corticium rolfsii* (Sacc) Curzi, American Type Culture Collection No. 15212; *Corticium rolfsii* Curzi/Ficus, American Type Culture Collection No. 15209; *Sclerotinia gladoli* American Type Culture Collection No. 15207; *Stromatinia narcissi* Groves, American Type Culture Collection No. 15213.

Suitable carbohydrate source materials for preparing the polysaccharide via the above-mentioned organisms include sucrose, D-xylose, D-mannose, D-glucose (dextrose), L-arabinose, D-galactose, D-fructose, maltose, D-melezitose, raffinose, methylbeta-maltoside, aesculin, cellobiose, trehalose, L-rhamnose, cellulose and xylan or mixtures thereof.

In preparing the polysaccharides herein employed the carbohydrate source material is dissolved in an aqueous solution generally at a concentration ranging from about 3 to 15 percent by weight along with other culture medium nutrients such as a yeast extract and mineral salts (e.g. Czapek-Dox broth).

The organism is then added to the culture medium, the pH is adjusted between about 3–6 and the temperature is maintained between about 25–35° F. (e.g. for about 3–6 days) whereby the polysaccharide is formed. The polysaccharide is then isolated from the medium and washed with an alcohol (e.g. methanol).

Pigments contemplated in the present paint compositions include colored as well as white pigments and is understood to be inclusive of mineral products used as fillers and extenders. Suitable pigments include the various water insoluble organic and inorganic paint pigments such as titanium dioxide, zinc oxide, phthalocyanine blue and green, lead chromate, molybdate orange, zinc sulfide, calcium sulfate, barium sulfate (barytes), clay, mica, calcium carbonate (whiting), silica, benzylidene yellow, cadmium yellow, toluidine toners, sienna, amber, ultramarine blues, chromium oxides, carbon black, antimony oxide, magnesium silicate (talc), aluminum silicate, lead silicate, graphite, aluminum oxide, calcium silicate, diatamaceous silica, limonite, hematite, magnetite, siderite, selenium sulfides, calcined nickel titanate dioxide, molybdate oranges, chrome green, iron blues, benzidine yellows and oranges, iron salts of nitroso compounds, Hanso yellows, Di-nitraniline oranges, permanent red 2B types and the like in various combinations and preparations depending on the end use for which the paint is designed. Suitable pigment dispersants such as tetra-sodium pyrophosphate, lecithin, gum arabic, sodium silicate, the various water soluble soaps, the aliphatic and aromatic sulfonates, sulfolignins, the aliphatic sulfates, various polyethers and ether-alcohol concentrates and the like may be added to enhance the dispersion of the paint pigments.

Although not necessary other auxiliary paint components may be added, for example, protective colloids or thickeners such as sodium carboxymethylcellulose, sodium and ammonium polyacrylate, gum karaya, sodium aliginate, methyl cellulose, hydroxyethyl cellulose, polyvinyl alcohol, starch, casein, soybean protein and gelatin; freeze-thaw stabilizers such as ethylene glycol, propylene glycol, glycol ethers, alkali metal salt of N-coco beta amino butyric acid, polysubstituted phenolates, modified glyceryl monoricinoleate, urea, thiourea, etc.; defoamers such as kerosene, pine oil, octyl alcohol, tributyl phosphate, phenyl mercuric acetate, etc.; buffers such as some of the protective colloids, sodium bicarbonate, sodium tetraborate and the like; coalescing agents such as "Carbitol," "Carbitol Acetate," hexylene glycol, "Butyl Cellosolve Acetate," and "Butyl Carbitol Acetate"; antirust agents like sodium benzoate; driers for unsaturated polymers, oils, and alkyds, oil modified epoxides and polymeric butadienes etc. (e.g. benzoyl peroxide, ferric tris 2,4-pentanedionate, $\alpha,\alpha'$-dipyridyl orthophenanthroline, chromium pentanedionate, the manganese, cobalt and lead naphthenates and the corresponding 2-ethylhexonates thereof).

Preferentially bacteriocides and fungicides such as the halogenated acetylene alcohols, diphenylmercuric dodecenyl succinate, o-phenylphenol and the sodium salt thereof, the trichlorophenols and the sodium salts thereof, and the like are added to protect the paint composition from degradation.

The expression "film forming binder" is intended to encompass those film forming resins employed in aqueous paint compositions. Representative film forming resins include any of the aqueous colloidal dispersion of polymers from the polymerization of monomers such as acrylic acid, methacrylic acid, methyl methacrylate, ethyl methacrylate, ethyl-hexyl-acrylate, tetrafluoroethylene, chlorotrifluoroethylene, vinylidene fluoride, butadiene-1,3, isoprene, chloroprene, styrene, nitriles, acrylamide, vinyl alcohol, methacrylamide, acrylonitrile, vinyl chloride, vinyl acetate, vinylidene chloride, ethylene, propylene and isobutylene; drying oil fatty acid compounds such as tuna oil, linseed oil, soybean oils, dehydrated castor oil, cottonseed oil, poppyseed oil, safflower oil, and sunflower oil; fatty acids derived from drying oils; partially polymerized drying oils such as partially polymerized linseed oil; oxidized drying oils such as oxidized soybean oil, synthetic drying oils obtained by the esterification of fatty acids with polyhydric alcohols (e.g. glycerol pentaerythritol, mannitol and sorbitol); drying oil-alkyl resins such as are obtained by the reaction of a drying oil fatty acid with polyhydric alcohol and a polycarboxylic acid such as maleic anhydride, fumaric acid, phthalic acid, adipic acid, sebacic acid, etc.; latices of chlorinated and natural rubbers, the polysulfides, epoxides, amino resins such as ureaformaldehyde, melamine-formaldehyde, nitrocellulose, ethyl cellulose, cellulose butyrate, chlorinated polyethers, terpene resins, chlorosulfonated polyethylene, natural rubber, organosiloxane polymers, and various other film forming binders employed in water-based paints.

Specific polymeric latex types commercially available, generally containing from 40 to 60 weight percent of an emulsified polymer, include styrene-butadiene copolymer, butadiene-acrylonitrile copolymers, polyvinyl chloride, polyvinyl acetate, natural rubber, polybutadiene, copolymers of vinylidene chloride and acrylonitrile, polytetrafluoroethylene, ethyl acrylate-methacrylate copolymers, butadiene-styrene-acrylonitrile copolymers, isobutyleneisoprene copolymers, acrylonitrile-butyl acrylate-methacrylic acid copolymers, styrene-butyl acrylate-acrylic acid copolymers, copolymers of styrene, acrylonitrile, octyl acrylate and methacrylic acid, copolymers of methyl methacrylate, ethyl acrylate and ammonium methacrylate, etc.

The following examples are illustrative of the invention:

EXAMPLE I.—PREPARATION OF THE POLYSACCHARIDE

Into a sterile culture medium consisting of:

| Ingredients | Parts |
|---|---|
| Distilled water | 300 |
| Sucrose | 9 |
| NaNo$_3$ | 0.9 |
| K$_2$HPO$_4$ | 0.3 |
| KCl | 0.15 |
| MgSO$_4$ | 0.15 |
| Autolyzed yeast | 0.3 |
| FeSO$_4$ | 0.003 | was inoculated with a loopful of Sclerotium rolfsii Barnett, American Type Culture Collection No. 15206 and incubated for 3 days at approximately 28° C. on a rotary shaker. The resultant culture was placed in a sterile blender, homogenized and set aside for use as an inoculum.

An aqueous carbohydrate source was prepared by dissolving the following ingredients in 500 gallons of water:

| Ingredients | Pounds |
|---|---|
| Glucose | 86 |
| Magnesium sulfate | 6.45 |
| Potassium dihydroorthophosphate | 4.3 |
| Sodium nitrate | 8.6 |
| BBL yeast extract | 4.3 |

The pH of the resulting medium was adjusted to 4.5 with hydrochloric acid and then heated for one hour at 15 p.s.i. and pressure at 250° F.

After the cultured medium had cooled, 15 pounds of the previously prepared homogenized inoculum was added to the fermenter vessel equipped with variable speed agitation, a sterile air supply and temperature control means. The medium was incubated for 5 days at a temperature of 28° F. and at an agitation rate of 96 r.p.m. and an aeration rate of 0.1 vol./vol. of medium per minute. The fermentate was then removed into another vessel to which 129,000 pounds of water were added. After thorough mixing the diluted fermentate was heated to approximately 90 to 95° C., cooled, and then filtered via a diatomaceous earth filter for removal of mold cells.

To the filtrate an equal volume of methanol was added. Within a few minutes, the product rose to the surface as a fibrous mass and was removed therefrom by skimming. The polysaccharide was washed twice with a methanol and then dried in an oven at 50° C. The resultant fibrous mat of polysaccharide was then comminuted to a fine powder.

Polysaccharide chemical and physical results

Specific rotation $[\alpha]D$: +4.4° (1N NaOH)
Products from polymer acid hydrolysis: Glucose
Mole percent formic acid derived from periodate oxidation: 25.5
Hydrolysis product of periodate oxidized gum: Glycerol
Average degree of polymerization: 750 glucopyranose units
Enzymatic hydrolysis products by 1–3 glucanase: 2:1 moles D-glucose to gentiobiose Viscosity of aqueous solutions After 24 hours (Brookfield viscometer, 23° C., 30 r.p.m., No. 3 spindle):

| Percent | Centipoises |
|---|---|
| 1.0 | 2200 |
| 1.25 | 3280 |
| 1.5 | About 4400 |

Additional information relating to the preparation of other polysaccharides and polysaccharides thereof is disclosed in my copending application S.N. 319,093, of which this is a continuation-in-part.

EXAMPLE II

A white exterior house paint was prepared using the resinous polysaccharide product of Example I, as follows:

| Materials | Pounds |
|---|---|
| Water | 208 |
| "Surfynol TG," sold by Air Reductions Chem. Co. (a mixture of tetramethyl decynediod and an alkyl phenyl ether of polyethylene glycol in ethylene glycol) | 2 |
| Ethylene glycol | 12 |
| Potassium tripolyphosphate | 5 |
| "Tamol 731" (25%), sold by Rohm & Haas (sodium carboxylate of a diisobutylene/maleic acid copolymer) | 10 |
| Titanium dioxide-rutile | 175 |
| Titanium dioxide-anatase | 50 |
| Zinc oxide | 125 |
| Magnesium silicate | 50 |
| Phenylmercuric acetate | 2 |
| Di-phenyl mercuric dodecenyl succinate | 2 |

Employing a Cowles dissolver, the above materials were mixed at a slow speed till thoroughly mixed. The agitation was then increased and the materials were ground to NS4 (North Standard) grind. The agitation was reduced and the following materials were then added in respective listed order:

| Materials: | Pounds |
|---|---|
| Isooctyl phenyl polyethoxy ethanol (25% in water) | 16 |
| Polysaccharide from Example I (2.5% dissolved in water) | 100 |
| "Acrysol G-110" sold by Rohm & Haas Co. (an ammonium polyacrylate 22% aqueous solution) | ¹8 |
| Water | ¹24 |
| Water | 48 |
| Heat polymerized linseed oil, "Cargill Formula 1308 (70%)" (sapon. No. 192–198), iodine No. 110–120, acid No. 3 max.) | 293 |
| Cobalt naphthenate (6% in petroleum solvent) | 1.8 |
| Manganese naphthenate (6% in petroleum solvent) | 1.8 |
| Lead naphthenate (24% in petroleum solvent) | 7 |
| Di-phenyl mercuric dodecenyl succinate | 2 |
| Total weight | 1142.6 |

¹ Premix.

The paint had the following properties:

KU viscosity (Krebs unit):
- Initial _____ 74
- 120° F. heat stability (two weeks) _____ 81
- 3 cycles freeze-thaw _____ 78
- 7½ hours stir _____ 76
- 24 hours tumble _____ 75 pH:
- Initial _____ 9.4
- 120° F. heat stability (two weeks) _____ 9.3

For comparative purpose a paint composition was prepared following the procedure of Example II except that a 2.5% aqueous solution of hydroxyethyl cellulose was employed instead of the 2.5% aqueous solution of polysaccharide. The following results were achieved:

KU viscosity (Krebs unit):
- Initial _____ 76
- 120° F. heat stability (two weeks) _____ 83
- 3 cycles freeze-thaw _____ 87
- 7½ hours stir _____ 77
- 24 hours tumble _____ 79 pH:
- Initial _____ 9.4
- 120° F. heat stability (two weeks) _____ 9.3

In addition to the improved freeze-thaw stability, heat stability and tumble stability over the paint composition containing hydroxyethyl cellulose, the polysaccharide paint composition had superior flow properties, improved brushing qualities and provided a smoother dried paint film. The paint composition containing the polysaccharide herein provided had excellent pigment dispersion and leveling characteristics.

EXAMPLE III.—Cold Water Casein Paint

| Materials: | Pounds |
|---|---|
| Whiting | 74.1 |
| Clay | 15.0 |
| Casein | 5.0 |
| Borax glass | 0.6 |
| Lime | 5.0 |
| Polysaccharide from Ex. I | 0.3 |
| | 100 |

The above materials were dry blended. Into a 10-pound portion of the dry blend, there was added ten pounds of water. A suitable paint for masonry and plaster surfaces was thus obtained.

EXAMPLE IV.—Emulsion Masonry Paint

| Materials: | Pounds |
|---|---|
| Polysaccharide from Ex. I, 4400 cps.—1.5% aqueous solution | 166 |
| Polypropylene glycol (1200) | 3 |
| Wetting agent | 2 |
| Lecithin-water dispersible | 3 |
| Ethylene glycol | 18 |
| Titanium dioxide-rutile | 250 |
| Calcium silicate | 70 |
| Phenyl mercuric acetate | 6 |

The above materials were added in the order given, then mixed and run through a Morehouse mill.

The following ingredients were then added and mixed thoroughly:

| | |
|---|---|
| Water | 210 |
| Diethylene glycol monoethyl ether | 15 |
| Latex (52% NVM), copolymer of vinyl acetate and 2-ethyl hexyl acrylate (viscosity 550–850 cps.) | 340 |
| Viscosity _____KU__ | 80 |
| Solids _____percent__ | 45 |
| PVC _____do____ | 36 |

EXAMPLE V.—Latex Wall Primer

A latex wall primer employing polyvinyl acetate and the polysaccharide of Example I was prepared from the following primer formula:

| Materials: | Pounds |
|---|---|
| Diethylene glycol monoethyl ether | 25.0 |
| Polysaccharide, 4000 cps., 1.4% aqueous solution | 5.2 |
| Water | 40.0 |
| Sodium salt of o-phenylphenol | 1.0 |
| Dispersing agent | 1.0 |
| Wetting agent | 2.0 |
| Polypropylene glycol (1200) | 2.0 |
| Dibutyl phthalate | 18.0 |
| Clay | 75.0 |
| Titanium dioxide-rutile | 100.0 |

After mixing the afore-mentioned materials were passed through a high speed mill. After which there was added the following:

| | |
|---|---|
| Water | 398.0 |
| Polyvinylacetate latex (55% solids) "Celanese CL-100" | 320.0 |
| Wt./gal. | 9.87 |
| Viscosity _____KU__ | 80 |
| PVC _____percent__ | 24.4 |

EXAMPLE VI.—Interior Wall Finish

| Materials: | Pounds |
|---|---|
| Titanium dioxide-rutile | 225.0 |
| Clay | 125.0 |
| Talc | 75.0 |
| Polysaccharide from Ex. I, 1.25% aqueous solution | 25.0 |
| Lecithin (water dispersible) | 5.0 |
| Morpholine | 0.5 |
| Defoamer | 1.0 |
| Water | 200.0 |

The above materials were mixed and passed through a high speed stone mill after which the following materials were added and mixed thoroughly:

Materials:
Styrene-butadiene latex (48% solids) _____pounds__ 350.0
Polysaccharide from Ex. I (2.5% aqueous

| Materials: | Pounds |
|---|---|
| solution) _____do____ | 75.0 |
| PVC _____percent__ | 40 |
| Wt./gal. _____pounds__ | 11.6 |
| Solids _____percent__ | 56 |

EXAMPLE VII

A latex paint having the following formulation was prepared:

| Pigment grind: | Pounds |
|---|---|
| Dibutyl phthalate _____ | 8 |
| "Tergitol NP-14" _____ | 5 |
| Lecithin _____ | 7 |
| Potassium carbonate _____ | 1 |
| Ethylene glycol _____ | 18 |
| Diethylene glycol monoethyl ether _____ | 17 |
| Titanium dioxide _____ | 225 |
| Talc _____ | 150 |
| Calcium carbonate _____ | 175 |
| Water _____ | 291 |
| Di-phenyl mercuric dodecenyl succinate ____ | 2 |
| Phenyl mercuric acetate _____ | 2 |

Paint Reduction:
Polysaccharide from Ex. I, 1.4% aqueous solution, 4000 cps. _____ 175
"Celanese 102" (commercial polyvinyl-acetate latex)—55% aqueous solution _____ 266

EXAMPLE VIII.—Acrylic Exterior Emulsion Paint

| Materials: | Pounds |
|---|---|
| Wetting agent _____ | 15.0 |
| Defoamer _____ | 2.0 |
| Water _____ | 50.0 |
| Titanium dioxide-rutile _____ | 210.0 |
| Titanium dioxide-anatose _____ | 40.0 |
| Mica-water ground _____ | 30.0 |
| Calcium carbonate _____ | 87.0 |
| Polysaccharide from Ex. I, 4000 cps. 1.4% aqueous solution _____ | 50.0 |
| Ethylene glycol _____ | 25.0 |
| Polyacrylic acid latex (46% NVM) _____ | 605.0 |
| Preservative _____ | 9.0 |
| Defoamer _____ | 2.0 |
| Water _____ | 8.0 |
| Ammonium hydroxide (28%) _____ | 1.0 |
| | 1134.0 |

Add the materials in order shown above, mix and grind in high speed stone mill and then add latex, preservative, defoamer, water and ammonium hydroxide.

| | |
|---|---|
| Solids _____percent__ | 57 |
| PVC _____do____ | 30 |
| Viscosity _____KU__ | 70–75 |

EXAMPLE IX.—Cedar Shake Coating

Materials:
| | |
|---|---|
| Titanium dioxide-rutile semi-chalking _____pounds__ | 175.0 |
| Calcium carbonate _____do____ | 75.0 |
| Talc _____do____ | 75.0 |
| Lecithin _____do____ | 3.0 |
| Dispersant _____do____ | 2.0 |
| "Carbitol Acetate" _____do____ | 8.0 |
| Defoamer _____do____ | 2.0 |
| "Celanese 204" (copolymer 55% solids) _____do____ | 350.0 |
| Water _____do____ | 345.0 |
| Polysaccharide from Ex. I, 0.1% aqueous solution) _____pounds__ | 50.0 |
| NVM _____percent__ | 48 |
| Viscosity _____KU__ | 60–65 |
| PVC _____percent__ | 37 |

EXAMPLE X.—Styrene-Butadiene Wall Finish

| Grind: | Pounds |
|---|---|
| Titanium dioxide-rutile _____ | 225.0 |
| Clay _____ | 125.0 |
| Talc _____ | 75.0 |
| Polysaccharide from Ex. I, 1% aqueous solution _____ | 10.0 |
| Lecithin (water dispersible) _____ | 5.0 |
| Morpholine _____ | 0.5 |
| Defoamer _____ | 1.0 |
| Water _____ | 120.0 |

Let down:
| | |
|---|---|
| Styrene-butadiene latex "Dow 512-K", (48% solids) _____ | 400.0 |
| Ethylene glycol _____ | 20.0 |
| Water _____ | 107.0 |

EXAMPLE XI

| First portion: | percent by weight |
|---|---|
| Titanium dioxide _____ | 19.5 |
| Calcium carbonate _____ | 12.5 |
| Solid polysaccharide Ex. I _____ | 0.12 |
| Potassium tripolyphosphate _____ | 0.10 |

Second portion:
| | |
|---|---|
| Anti-foam agent-anionic sulfated saturated fatty acids containing about 8% free fatty acid, "Nopco" 1497V 60% active _____ | 0.28 |
| Ethylene glycol _____ | 1.60 |
| Ammonium hydroxide 28% NH$_3$ _____ | 0.43 |
| Rheology controlling agent "Acrysol" A–3—25% aqueous solution (low molecular weight, water soluble, polyacrylic acid) _____ | 0.60 |
| Anti-foam (propylene glycol M.W. 1200) __ | 0.40 |
| Pigment dispersing surfactant "Tamol" 731—25% in water (sodium carboxylate of a diisobutylene/maleic acid copolymer) _____ | 0.20 |
| Phenyl mercury oleate—10% in mineral spirits _____ | 1.80 |
| Water _____ | 19.17 |

Third portion:
| | |
|---|---|
| Butyl rubber aqueous dispersion "Enjay" ML–600–45 45% polymer content _____ | 21.0 |
| Methyl methacrylate-ethyl acrylate-methacrylic acid polymer latex-polymer, 45% solids "Rhoplex AC–33" _____ | 21.0 |
| "Acrysol" ACE–60 (28% aqueous solution of a water-soluble carboxylic ternary copolymer of methyl methacrylate, ethylacrylate and acrylic acid) _____ | 1.3 |
| | 100.00 |

In preparing the paint composition, the ingredients of the first portion were dry blended until uniform. Then the liquid portion of the second portion was added to the first portion to form a pigment paste which was dispersed by one pass on a three roll dispersion mill. The components of the third portion were mixed with the combined first and second portions until the product was uniform.

As understood by those skilled in the art and the examples hereinbefore described, it is apparent that various surfactant systems suitably employed to aid in the dispersion of pigment particles, film forming binders, etc., such as disclosed on pages 43–57 in Emulsion & Water—Soluble Paints & Coatings by C. R. Martens and published by Reinhold Publishing Corp. copyright 1965, are adaptable to the present invention.

It is apparent that many modifications and variations of this invention as hereinbefore set forth may be without departing from the spirit and scope thereof. The specific embodiments described are given by way of example only and the invention is limited only by the terms of the appended claims.

What is claimed is:

1. A paint composition employable in an aqueous system suitable for forming a protective coating when applied to a surface, said paint composition containing a paint pigment and a water-soluble polysaccharide, said polysaccharide comprising a high molecular weight polysaccharide having the characteristics of a thickening agent and composed of an average of at least about 120 D-glucopyranose units, at least a portion of said units being present in the first form:

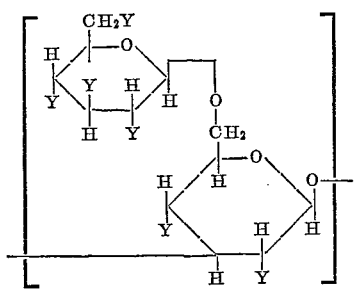

the remainder of said units being present in the second form:

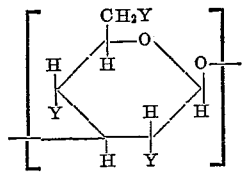

wherein Y represents $OH_1$ said polysaccharide forming formic acid on being subjected to periodate oxidation, the amount of said formic acid corresponding to the number of said units in said first form; and substituted derivatives of said polysaccharide, wherein at least a portion of said Y substituents are selected from the class consisting of OR, OOCR, $OCH_2COOH$, $OSO_3H$, $ONO_2$, $OCS_2H$ and $OOCNH\phi$, wherein R is a member of the class consisting of lower alkyl and phenyl.

2. The paint composition according to claim 1 wherein Y is OH.

3. The paint composition according to claim 1 wherein the polysaccharide is further characterized as having a ratio of units in the second form to units of the first form ranging from about 2:1 to about 3:2.

4. The paint composition according to claim 3 wherein the ratio is about 2:1.

5. The paint composition according to claim 4 wherein the average molecular weight of the polysaccharide is at least 19,000.

6. The paint composition according to claim 4 wherein Y is OH.

7. The paint composition according to claim 3 wherein the ratio is about 3:2.

8. The paint composition according to claim 7 wherein the molecular weight of the polysaccharide is at least 19,000.

9. The paint composition according to claim 8 wherein Y is OH.

10. A novel paint composition suitable for forming a protective coating when applied to a surface comprising water, a paint film forming binder, a paint pigment and a water-soluble polysaccharide, said polysaccharide comprising a high molecular weight polysaccharide having the characteristics of a thickening agent in water and composed of an average of at least about 120 D-glucopyranose units, at least a portion of said units being present in the first form:

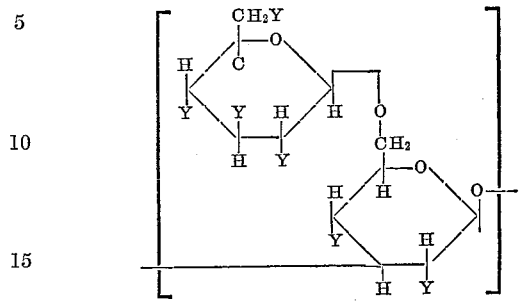

the remainder of said units being present in the second form:

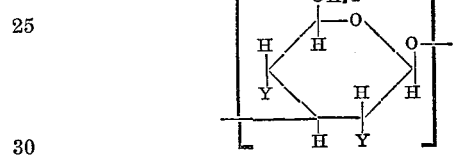

wherein Y represents OH, said polysaccharide forming formic acid on being subjected to periodate oxidation, the amount of said formic acid corresponding to the number of said units in said first form; and substituted derivatives of said polysaccharide, wherein at least a portion of said Y substituents are selected from the class consisting of OR, OOCR, $OCN_2COOH$, $OSO_3H$, $ONO_2$, $OCS_2H$ and $OOCNH\phi$, wherein R is a member of the class consisting of lower alkyl and phenyl.

11. The paint composition according to claim 10 wherein Y is OH.

12. The paint composition according to claim 10 wherein the polysaccharide is further characterized as having a ratio of units in the second form to units of the first form ranging from about 2:1 to about 3:2.

13. The paint composition according to claim 12 wherein the ratio is about 2:1.

14. The paint composition according to claim 13 wherein the average molecular weight of the polysaccharide is at least 50,000.

15. The paint composition according to claim 14 wherein Y is OH.

16. The paint composition according to claim 12 wherein the ratio is about 3:2.

17. The paint composition according to claim 16 wherein the average molecular weight of the polysaccharide is at least 50,000.

18. The paint composition according to claim 17 wherein the polysaccharide is an unsubstituted polysaccharide.

19. A paint composition suitable for forming a protective coating when applied to a surface consisting essentially of an aqueous mixture of water, a paint film forming binder, an inorganic paint pigment and a water-soluble polysaccharide in an amount ranging from about 0.1 to less than 1.5 weight percent of the total water content of said paint composition, said polysaccharide being represented by the structural formula:

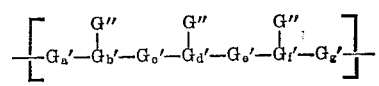

wherein G' is a glucopyranose unit of the formula:

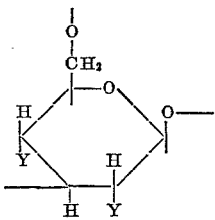

which is contiguously attached to the adjacent glucopyranose units through a beta 1,3 linkage in the polymeric chain and also appended to another glucopyranose unit through a beta 1,6 linkage to form a side chain; G is glucopyranose units of the formula:

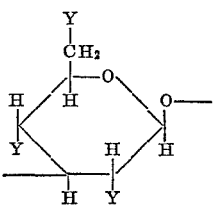

G" is a glucopyranose unit attached to the G' glucopyranose unit through a beta 1,6 linkage of the formula:

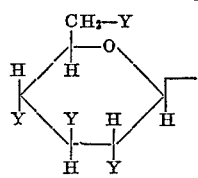

wherein Y is a member of the class consisting of OH, OR, OOCR, OCH$_2$COOM, OSO$_3$M, OPO$_3$M, ONO$_2$, OCS$_2$M, OOCNH$\phi$, OOCNRR' where R and R' are members of the class consisting of lower alkyl compounds and aryl compounds, $\phi$ is a phenyl group and M is a cation, and $a, b, c, d, e, f,$ and $g$ are integers from 0 to 1 such that the ratio of the sum of G units to G' units ranges from 3:1 to 4:3 with the polysaccharide containing at least 120 glucopyranose units.

20. The paint composition according to claim 19 wherein Y is a hydroxyl group and the average molecular weight of the polysaccharide is at least 50,000.

References Cited

UNITED STATES PATENTS

| | | | |
|---|---|---|---|
| 3,301,848 | 1/1967 | Halleck | 260—210 |
| 2,490,070 | 12/1949 | Luaces | 106—215 |
| 2,503,623 | 4/1950 | Luaces | 106—215 |
| 2,503,624 | 4/1950 | Luaces | 106—217 |
| 2,725,303 | 4/1955 | Deniston | 106—162 |
| 2,734,828 | 2/1956 | Toulmin | 106—162 |
| 2,989,518 | 6/1961 | Novak | 106—162 |
| 2,988,455 | 6/1961 | Rosenberg. | |

OTHER REFERENCES

Smith: The Chemistry of Plant Gums & Muscilages, p. 206 (1959).

MORRIS LIEBMAN, Primary Examiner.

H. H. FLETCHER, Assistant Examiner.

U.S. Cl. X.R.

260—3, 3.3, 18, 29.6, 29.4, 29.7, 37, 39, 41, 41.5, 29